(12) United States Patent
Chang

(10) Patent No.: US 10,691,587 B2
(45) Date of Patent: Jun. 23, 2020

(54) METHODS AND SYSTEMS FOR CONTROLLING HARDWARE QUEUES

(71) Applicant: X-Drive Technology, Inc., San Jose, CA (US)

(72) Inventor: Darder Chang, San Jose, CA (US)

(73) Assignee: X-Drive Technology, Inc., San Jose, CA (US)

( * ) Notice: Subject to any disclaimer, the term of this patent is extended or adjusted under 35 U.S.C. 154(b) by 60 days.

(21) Appl. No.: 15/685,731

(22) Filed: Aug. 24, 2017

(65) Prior Publication Data

US 2019/0065358 A1  Feb. 28, 2019

(51) Int. Cl.
| | | |
|---|---|---|
| *G06F 12/00* | (2006.01) | |
| *G06F 13/38* | (2006.01) | |
| *G06F 12/0875* | (2016.01) | |
| *G06F 12/123* | (2016.01) | |
| *H04L 12/879* | (2013.01) | |
| *G06F 5/06* | (2006.01) | |

(52) U.S. Cl.
CPC .......... *G06F 12/00* (2013.01); *G06F 12/0875* (2013.01); *G06F 12/123* (2013.01); *G06F 13/385* (2013.01); *G06F 5/06* (2013.01); *H04L 49/901* (2013.01)

(58) Field of Classification Search
CPC .... G06F 12/00; G06F 13/385; G06F 12/0875; G06F 5/06; G06F 12/123; H04L 49/901
See application file for complete search history.

(56) References Cited

U.S. PATENT DOCUMENTS

| | | | | |
|---|---|---|---|---|
| 5,502,833 | A  * | 3/1996 | Byrn | G06F 5/06 710/240 |
| 6,892,285 | B1 * | 5/2005 | Key | H04L 29/06 370/392 |
| 9,898,341 | B2 | 2/2018 | Chang et al. | |
| 2003/0074388 | A1 * | 4/2003 | Pham | H04L 49/254 718/106 |
| 2006/0227811 | A1 * | 10/2006 | Hussain | H04L 49/90 370/503 |

* cited by examiner

*Primary Examiner* — David Yi
*Assistant Examiner* — Alan Otto
(74) *Attorney, Agent, or Firm* — Silicon Valley Patent Group LLP; Thomas C. Chan

(57) ABSTRACT

Method and system are disclosed for controlling hardware queues. In one embodiment, a system for controlling hardware queues includes a slow memory configured to store a set of hardware queues, a set of fast memories configured to facilitate operations to the set of hardware queues in the slow memory, where a fast memory in the set of fast memories includes a head cache configured to track read operations of a hardware queue in the set of hardware queues, and a tail cache configured to track write operations of the hardware queue in the set of hardware queues, a set of queue control engines configured to control the write operations and read operations to the set of hardware queues through the set of fast memories, and a processor configured to control the set of queue control engines with the write operations and read operations to the set of hardware queues through the set of fast memories.

18 Claims, 11 Drawing Sheets

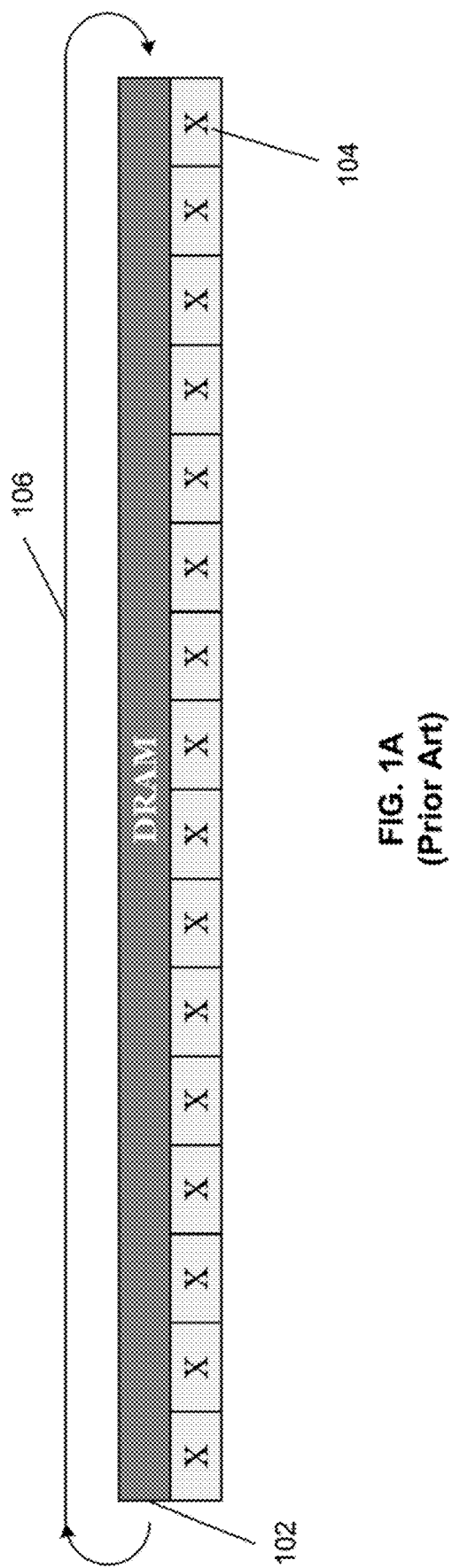
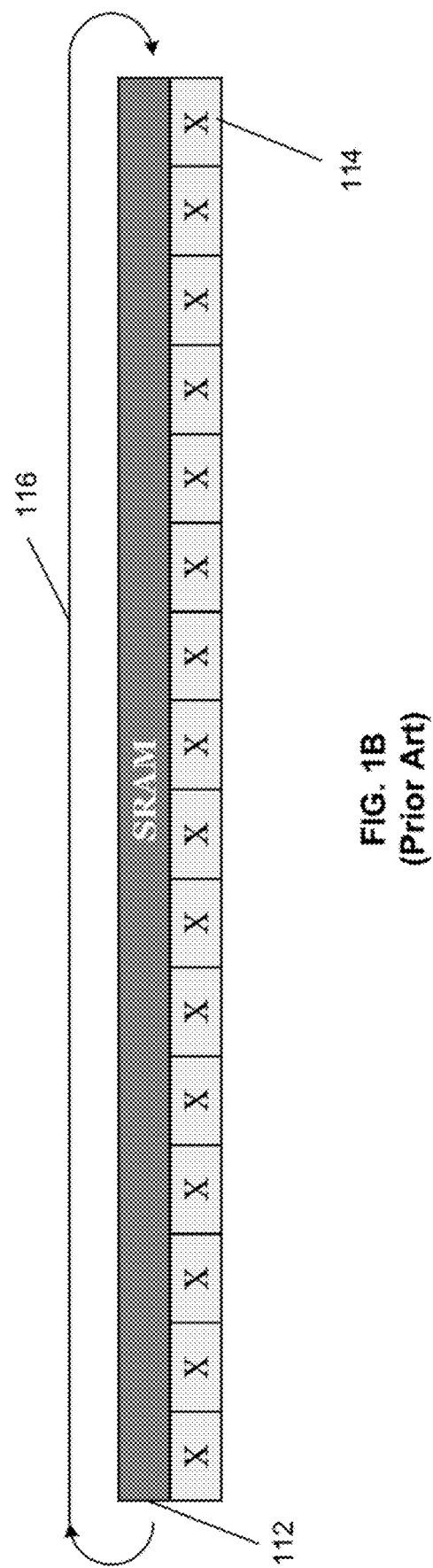
FIG. 1A
(Prior Art)
FIG. 1B
(Prior Art)

METHODS AND SYSTEMS FOR CONTROLLING HARDWARE QUEUES

FIELD OF THE INVENTION

The present invention relates to the field of data access in data center applications. In particular, the present invention relates to methods and systems for controlling hardware queues.

BACKGROUND

FIG. 1A illustrates a conventional method for controlling a hardware queue. As shown in FIG. 1A, the hardware queue is implemented with dynamic random access memory (DRAM) 102. Data stored in the hardware queue, represented with the symbol X 104, may be pointers to other contents of a database. The hardware queue may be configured to implement a first-in first-out (FIFO) queue. The FIFO queue may be wrapped around, as indicated by arrow 106. Although a hardware queue implemented with DRAM may be lower in cost, this low cost implementation comes with tradeoffs. First, DRAMs are not efficient in handling non-sequential short data accesses, such as accessing pointers stored in a FIFO queue. In addition, comparing to other alternative solutions, the accessing time to DRAMs tends to be slower, as the accessing time may be negatively affected by the number of accesses to the DRAMs and the priority of controller of the hardware queue versus other entities that may access the DRAMs.

FIG. 1B illustrates another conventional method for controlling a hardware queue. In the example of FIG. 1B, the hardware queue is implemented with static random access memory (SRAM) 112. Data stored in the hardware queue, represented with the symbol X 114, may be pointers to other contents of a database. The hardware queue may be configured to implement a first-in first-out (FIFO) queue. The FIFO queue may be wrapped around, as indicated by arrow 116. Although a hardware queue implemented with SRAM may have cured the defect of DRAM in handling non-sequential short data accesses and has improved the access time as compared to DRAM, it comes with a cost. In general, the cost of SRAMs is numerous times higher than the cost of DRAMs. In data center applications, where millions of users may be accessing different data contents simultaneously, it would take a large number of hardware queues to support such data center applications. The cost of implementing hardware queues with SRAMs for data center applications may be prohibitively expensive.

Therefore, there is a need for methods and systems that address the issues of the conventional hardware queues described above. Specifically, there is a need for methods and systems for controlling hardware queues.

SUMMARY

Methods and systems are disclosed for controlling hardware queues. In one embodiment, a method for controlling hardware queues includes providing a slow memory configured to store a set of hardware queues, facilitating operations to the set of hardware queues in the slow memory using a set of fast memories, where a fast memory in the set of fast memories includes a head cache configured to track read operations of a hardware queue in the set of hardware queues, and a tail cache configured to track write operations of the hardware queue in the set of hardware queues, controlling the write operations and read operations, by a set of queue control engines, to the set of hardware queues through the set of fast memories, and controlling the set of queue control engines, by a processor, with the write operations and read operations to the set of hardware queues through the set of fast memories.

In another embodiment, a system for controlling hardware queues includes a slow memory configured to store a set of hardware queues, a set of fast memories configured to facilitate operations to the set of hardware queues in the slow memory, where a fast memory in the set of fast memories includes a head cache configured to track read operations of a hardware queue in the set of hardware queues, and a tail cache configured to track write operations of the hardware queue in the set of hardware queues, a set of queue control engines configured to control the write operations and read operations to the set of hardware queues through the set of fast memories, and a processor configured to control the set of queue control engines with the write operations and read operations to the set of hardware queues through the set of fast memories.

BRIEF DESCRIPTION OF THE DRAWINGS

The aforementioned features and advantages of the invention, as well as additional features and advantages thereof, will be more clearly understandable after reading detailed descriptions of embodiments of the invention in conjunction with the following drawings.

FIG. 1A illustrates a conventional method for controlling a hardware queue.

FIG. 1B illustrates another conventional method for controlling a hardware queue.

DESCRIPTION OF EMBODIMENTS

Methods and systems are provided for controlling hardware queues. The following descriptions are presented to enable any person skilled in the art to make and use the invention. Descriptions of specific embodiments and applications are provided only as examples. Various modifications and combinations of the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the widest scope consistent with the principles and features disclosed herein.

Some portions of the detailed description that follows are presented in terms of flowcharts, logic blocks, and other symbolic representations of operations on information that can be performed on a computer system. A procedure, computer-executed step, logic block, process, etc., is here conceived to be a self-consistent sequence of one or more steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Figure 2A:
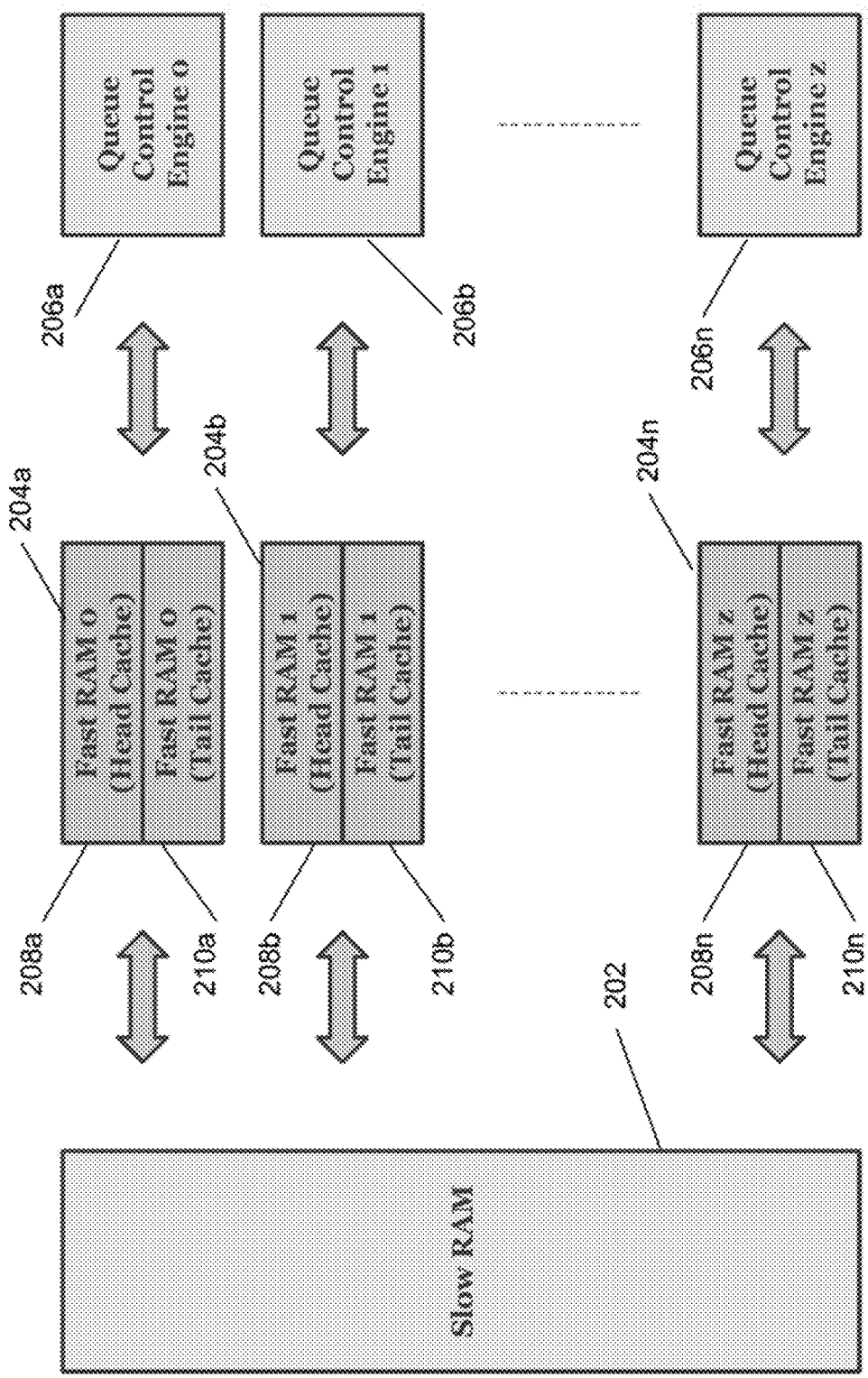
FIG. 2A illustrates an exemplary implementation of a system for controlling a plurality of hardware queues according to aspects of the present disclosure.

FIG. 2A illustrates an exemplary implementation of a system for controlling a plurality of hardware queues according to aspects of the present disclosure. In the exemplary implementation shown in FIG. 2A, multiple hardware queues may be implemented with a combination of a slow random access memory (RAM) 202 and a set of fast RAMs such as 204a, 204b . . . and 204n. Each of the fast RAM in the set of fast RAMs may be controlled by a corresponding queue control engine, labelled as 206a, 206b . . . 206n. In addition, each of the fast RAM in the set of fast RAMs may include a head cache, labelled as 208a, 208b . . . 208n, respectively. Each of the fast RAM in the set of fast RAMs may include a tail cache, labelled as 210a, 210b . . . 210n, respectively. As to be further described below, this system for controlling the multiple hardware queues may be benefited by having a large number of hardware queues to be stored in the slow RAM 202, and at the same time enable efficient accesses to the large number of hardware queues through a set of fast RAMs (204a, 204b . . . 204n) and the set of queue control engines (206a, 206b . . . 206n). According to aspects of the present disclosure, the size of the set of fast RAMs (204a, 204b . . . and 204n) are many orders of magnitudes smaller than the size of the fast RAM 116 (FIG. 1B) as in the conventional hardware queue implementations. Because of such reduction in the use of fast RAMs as compared to the conventional implementation shown in FIG. 1B, the disclosed implementation may achieve a substantial reduction in cost and at the same time maintaining substantially the high performance as if the multiple hardware queues were implemented with fast RAMs, such as SRAMs.

Figure 2B:
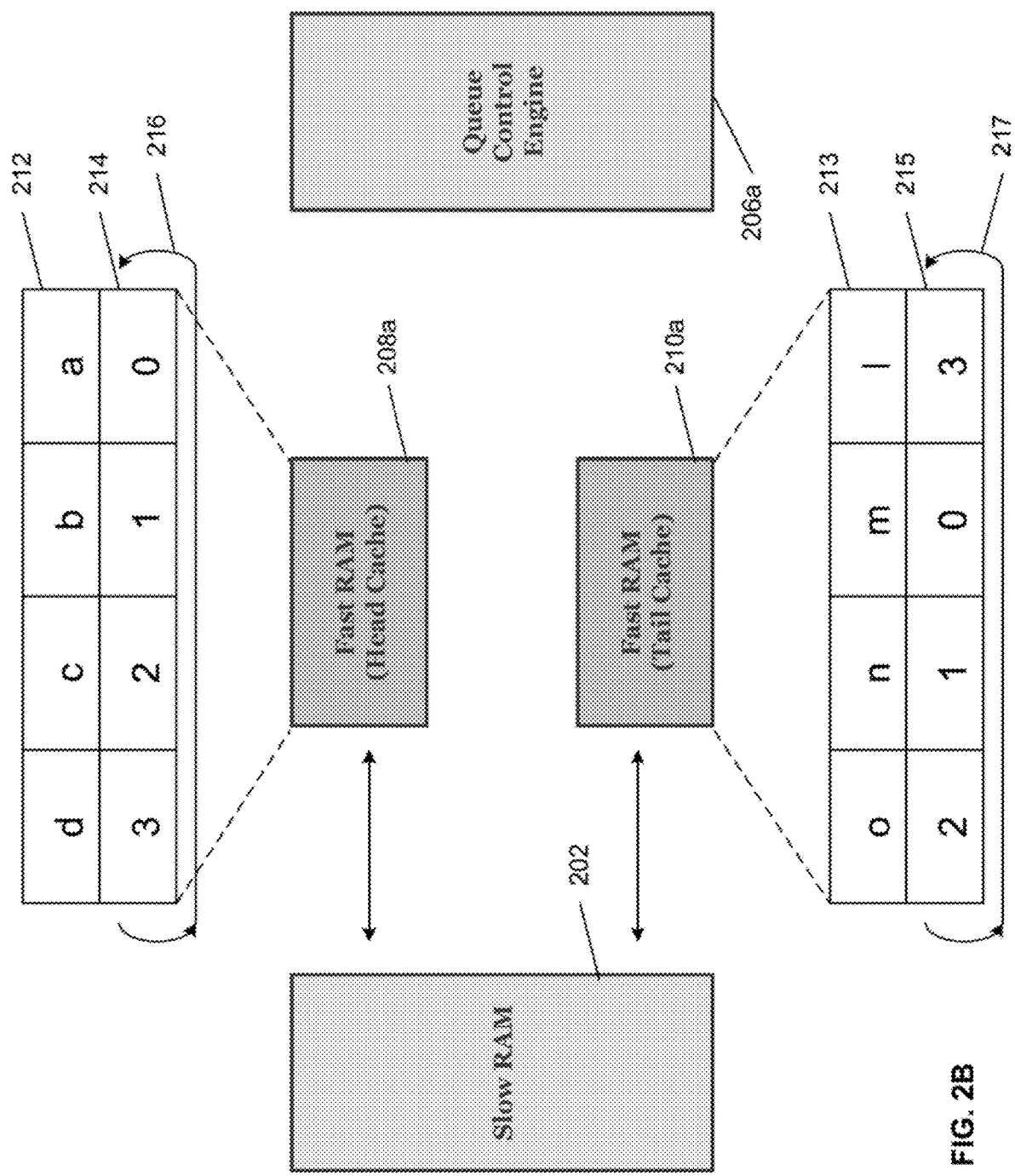
FIG. 2B illustrates an exemplary implementation of a channel of the system of FIG. 2A according to aspects of the present disclosure.

FIG. 2B illustrates an exemplary implementation of a channel of the system of FIG. 2A according to aspects of the present disclosure. In this example, the channel of the system, implementing one hardware queue is shown. In particular, it includes a portion of the slow RAM 202, the corresponding queue control engine 206a, and the fast RAM, which is represented by the head cache 208a and the tail cache 210a. Note that, according to aspects of the present disclosure, the head cache 208a and the tail cache 210a are equal in size and the size of the head cache 208a and the tail cache 210a is programmable. In other words, each channel of the system may be configured to support a hardware queue of a programmable size. The size of the head cache and the tail cache may be adjusted based on various performance criteria, such as the frequency of access to the slow RAM 202, the priority of the queue control engine 206a with respect to the slow RAM 202, and the bandwidth of the slow RAM being allocated to the queue control engine 206a.

FIG. 2B further illustrates an exemplary implementation of the head cache 208a and the tail cache 210a. In this example, the size of the head cache 208a is configured to store four data elements; the tail cache is also configured to store four data elements. The top row 212 of the head cache 208a shows the four data elements, namely a, b, c, and d; each of the data element is tracked with a corresponding index, namely 0, 1, 2, and 3. The head cache may be implemented in a FIFO manner, and it may be wrapped around as indicated by the arrow 216. Similarly, the top row 213 of the tail cache 210a shows the four data elements, namely l, m, n, and o; each of the data element is tracked with a corresponding tail index 215, namely 3, 0, 1, and 2. The tail cache may also be implemented in a FIFO manner, and it may be wrapped around as indicated by the arrow 217. Note that the tail cache 210a shown in FIG. 2B is in one of the wrapped around state. In a reset state, the first data element would be associated with index 0, the second data element would be associated with index 1, and so on. In addition, the number of data elements in the head cache 208a or the tail cache 210a is equal to a power of 2 (i.e., $2**2=4$, in the example of FIG. 2B). Each data element may be 8 bits, 16 bits, 32 bits, 64 bits, or 128 bits in length. The control and operations of the slow RAM 202, head cache 208a, tail cache 210a, and the queue control engine 206a are further described below in association with FIG. 2C.

Figure 2C:
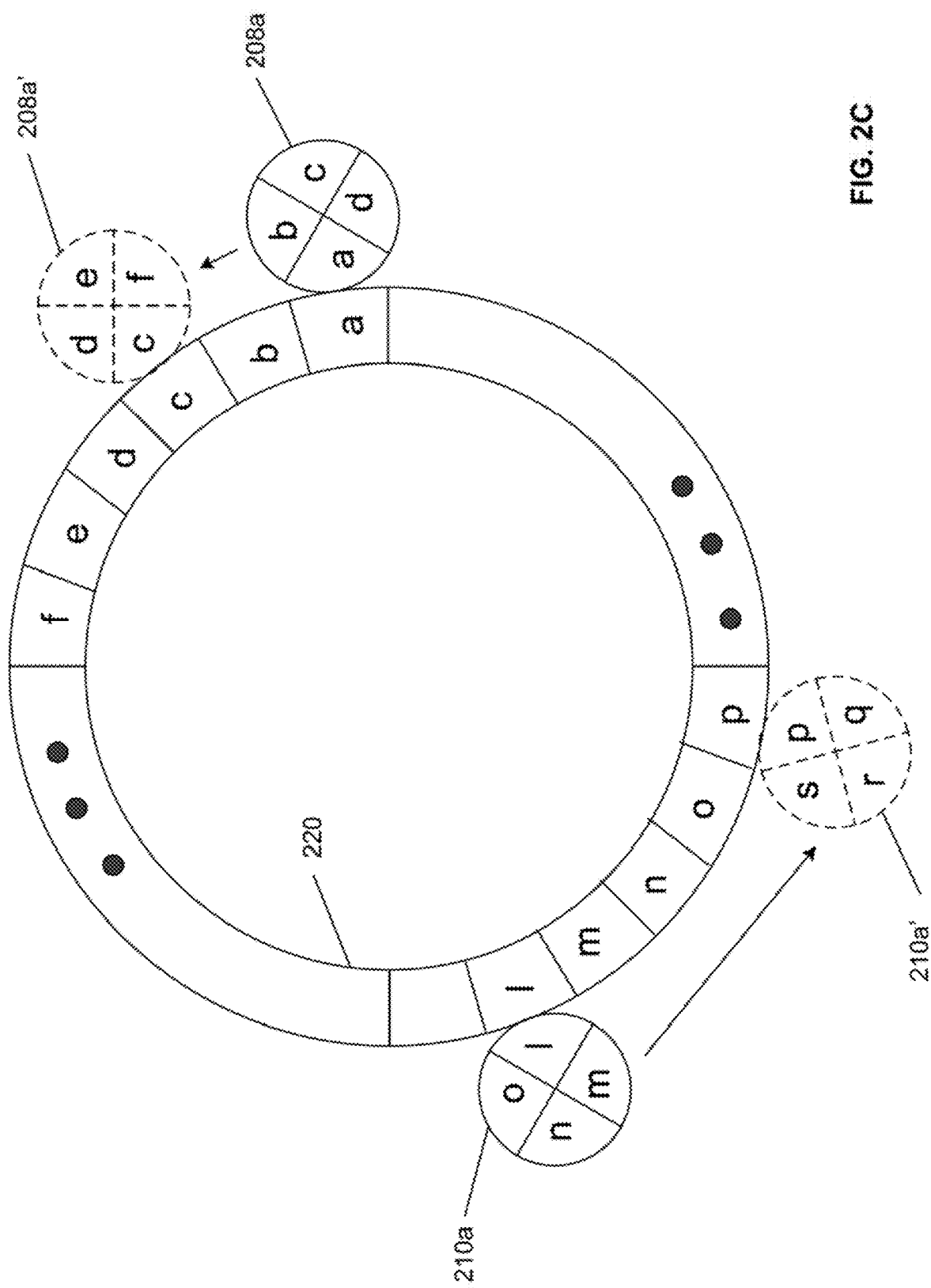
FIG. 2C illustrates exemplary interactions between the fast RAM and slow RAM of FIG. 2B according to aspects of the present disclosure.

FIG. 2C illustrates exemplary interactions between the fast RAM and slow RAM of FIG. 2B according to aspects of the present disclosure. As shown in FIG. 2C, a hardware queue 220, represented as a big circle, may use a portion of the slow RAM 202. The hardware queue may have storage for a large number of data elements, represented by the black dots inside the hardware queue 220. The head cache 208a and tail cache 210a, implemented with fast RAM, may have a programmable size. In this example, the head cache 208a is depicted to contain four data elements, namely a, b, c, and d. The tail cache 210a is depicted to contain four data elements l, m, n, and o. Initially, when the hardware queue 220 is empty, both the head cache 208a and the tail cache 210a are pointing to the same location in the hardware queue 220.

As data is written to the hardware queue 220, the head cache 208a is configured to track the head location of the hardware queue 220, and the tail cache 210a is configured to track the tail location of the hardware queue 220. For example, as more and more data is written to the hardware queue 220 through the tail cache 210a, the tail cache 210a moves around the hardware queue 220. As shown in FIG. 2C, the tail cache 210a may have stored the data elements l, m, n, and o; and is configured to write these data elements onto the hardware queue 220. Upon written data elements l, m, n, and o, the updated tail cache 210a' (represented in dotted lines) may be configured to store other data elements such as p, q, r, and s at a later time; and the data elements p, q, r, and s may then be controlled to be written to the hardware queue 220, based on the availability of the hardware queue 220 and the priority of this write operation. In some implementations, the transfer of data from the tail cache 210a to the hardware queue 220 may be performed only when the tail cache 210a is full, that is when the tail cache 210a has all four of its slots filled in the example of FIG. 2C. In some other implementations, the transfer of data from the tail cache 210a to the hardware queue 220 may be performed when the tail cache 210a is partially full; this approach may be implemented because each data element contained in the tail cache 210a is tracked by its corresponding tail index 215 (shown in FIG. 2B).

As data is read from the hardware queue 220, the head cache 208a is configured to track the head location of the hardware queue 220. For example, as data is read from the hardware queue 220 through the head cache 208a, the head cache 208a moves around the hardware queue 220. As shown in FIG. 2C, the head cache 208a has moved from location that stores data element "a" to the location that stores data element "c", upon reading the data elements a and b from the hardware queue 220. The updated head cache 208a' is represented in dotted lines. The data elements a, b, c and d is controlled to be read from the hardware queue 220, based on the availability of the hardware queue and the priority of this read operation. In some implementations, the transfer of data from the hardware queue to the head cache 208a is performed to fill all four data elements of the head cache 208a in one operation; that is when all four of its slots of the head cache 208a can be filled in the example of FIG. 2C. In some other implementations, the transfer of data from the hardware queue 220 to the head cache 208a may be performed in multiple read operations; this approach may be implemented because each data element contained in the head cache 208a is tracked by its corresponding head index 214 (shown in FIG. 2B).

Figure 2D:
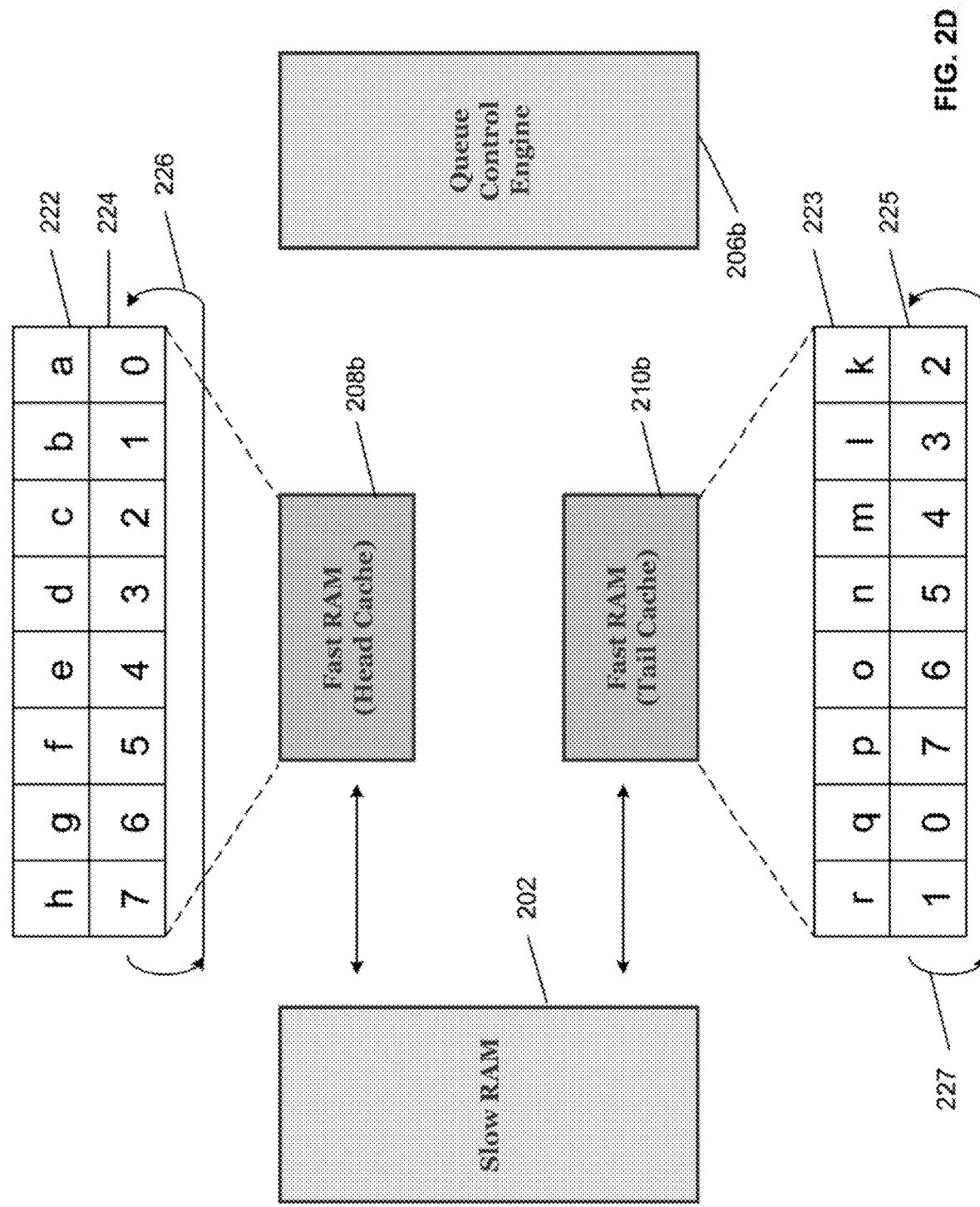
FIG. 2D illustrates another exemplary implementation of a channel of the system of FIG. 2A according to aspects of the present disclosure.

FIG. 2D illustrates another exemplary implementation of a channel of the system of FIG. 2A according to aspects of the present disclosure. In this example, the channel of the system, implementing another hardware queue is shown. In particular, it includes a portion of the slow RAM 202, the corresponding queue control engine 206b, and the fast RAM 204b, which is represented by the head cache 208b and the tail cache 210b. Note that, according to aspects of the present disclosure, the head cache 208b and the tail cache 210b are equal in size and the size of the head cache 208b and the tail cache 210b is programmable. In other words, each channel of the system may be configured to support a hardware queue of a programmable size. The size of the head cache and the tail cache may be adjusted based on various performance criteria, such as the frequency of access to the slow RAM 202, the priority of the queue control engine 206b with respect to the slow RAM 202, and the bandwidth of the slow RAM being allocated to the queue control engine 206b.

FIG. 2D further illustrates an exemplary implementation of the head cache 208b and the tail cache 210b. In this example, the size of the head cache 208b is configured to store eight data elements; the tail cache is also configured to store eight data elements. The top row 222 of the head cache 208b shows the four data elements, namely a, b, c, d, e, f, g, and h; each of the data element is tracked with a corresponding head index 224, namely 0, 1, 2, 3, 4, 5, 6, and 7. The head cache may be implemented in a FIFO manner, and it may be wrapped around as indicated by the arrow 226. Similarly, the top row 223 of the tail cache 210b shows the eight data elements, namely k, l, m, n, o, p, q, and r; each of the data element is tracked with a corresponding tail index 225, namely 2, 3, 4, 5, 6, 7, 0, and 1. The tail cache may also be implemented in a FIFO manner, and it may be wrapped around as indicated by the arrow 227. Note that the tail cache 210b shown in FIG. 2D is in one of the wrapped around state. In a reset state, the first data element would be associated with index 0, the second data element would be associated with index 1, and so on. In addition, the number of data elements in the head cache 208b or the tail cache 210b is equal to a power of 2 (i.e., 2**3=8, in the example of FIG. 2D). Each data element may be 8 bits, 16 bits, 32 bits, 64 bits, or 128 bits in length. The control and operations of the slow RAM 202, head cache 208b, tail cache 210b, and the queue control engine 206a are further described below in association with FIG. 2E.

Figure 2E:
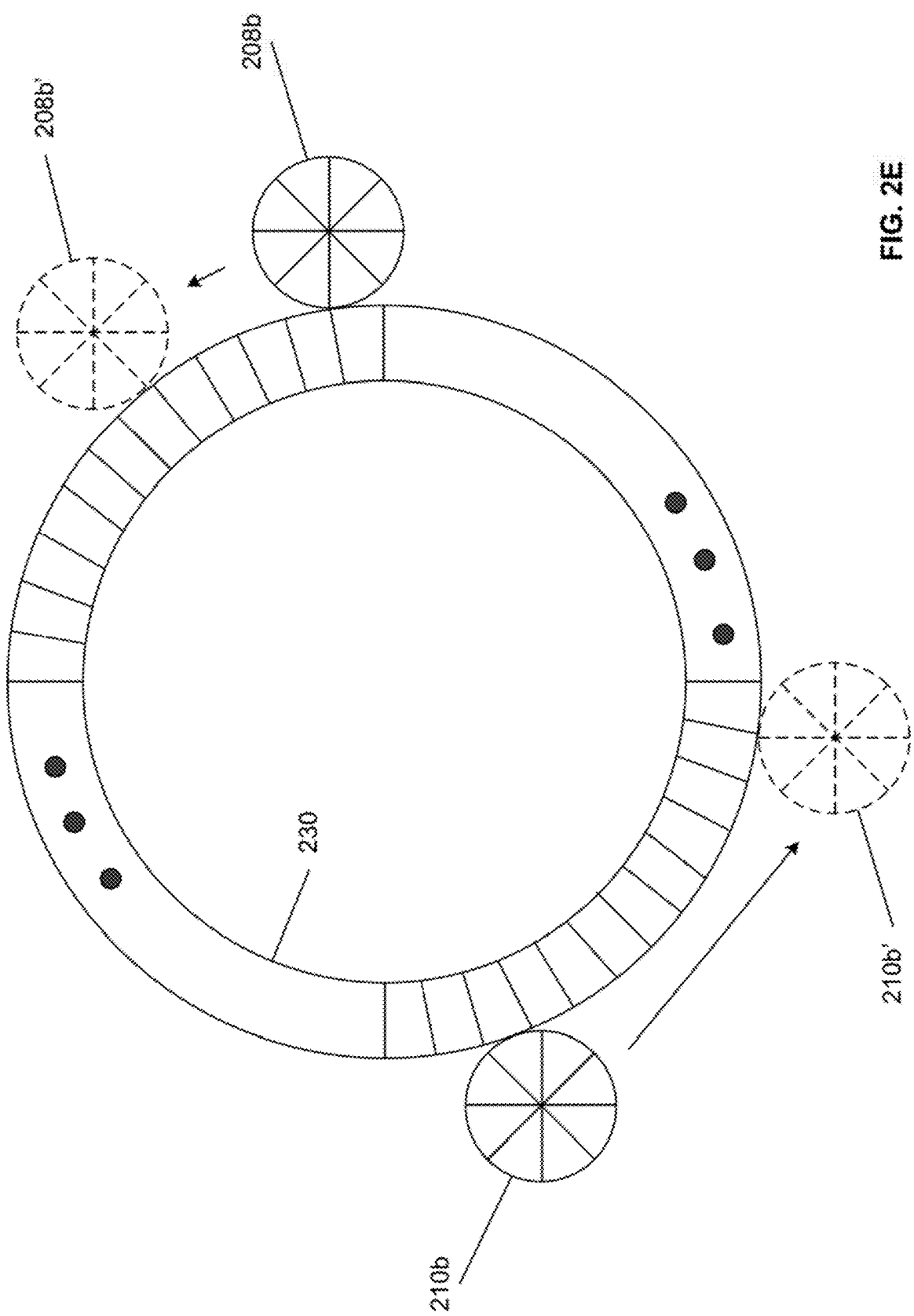
FIG. 2E illustrates exemplary interactions between the fast RAM and slow RAM of FIG. 2D according to aspects of the present disclosure.

FIG. 2E illustrates exemplary interactions between the fast RAM and slow RAM of FIG. 2D according to aspects of the present disclosure. As shown in FIG. 2E, a hardware queue 230, represented as a big circle, may use a portion of the slow RAM 202. The hardware queue may have storage for a large number of data elements, represented by the black dots inside the hardware queue 230. The head cache 208b and tail cache 210b, implemented with fast RAM, may have a programmable size. In this example, the head cache 208b is depicted to contain eight data elements. The tail cache 210b is depicted to contain eight data elements. Initially, when the hardware queue 230 is empty, both the head cache 208b and the tail cache 210b are pointing to the same location in the hardware queue 230.

As data is written to the hardware queue 230, the head cache 208b is configured to track the head location of the hardware queue 230, and the tail cache 210b is configured to track the tail location of the hardware queue 230. For example, as more and more data is written to the hardware queue 230 through the tail cache 210b, the tail cache 210b moves around the hardware queue 230. As shown in FIG. 2E, the tail cache 210b may have stored the data elements; and is configured to write these data elements onto the hardware queue 230. Upon written data elements to the hardware queue 230, the updated tail cache 210b' (represented in dotted lines) may be configured to store other data elements to be written to the hardware queue 230 at a later time, based on the availability of the hardware queue 230 and the priority of this write operation. In some implementations, the transfer of data from the tail cache 210b to the hardware queue 230 may be performed only when the tail cache 210b is full, that is when the tail cache 210b has all eight of its slots filled in the example of FIG. 2E. In some other implementations, the transfer of data from the tail cache 210b to the hardware queue 230 may be performed when the tail cache 210b is partially full; this approach may be implemented because each data element contained in the tail cache 210b is tracked by its corresponding tail index 225 (shown in FIG. 2D).

As data is read from the hardware queue 230, the head cache 208b is configured to track the head location of the hardware queue 230. For example, as data is read from the hardware queue 230 through the head cache 208b, the head cache 208b moves around the hardware queue 230. As shown in FIG. 2E, the head cache 208b may move to a location indicating the current head of the hardware queue; the updated head cache 208a' is represented in dotted lines. The data elements are controlled to be read from the hardware queue 230, based on the availability of the hardware queue and the priority of this read operation. In some implementations, the transfer of data from the hardware queue 230 to the head cache 208b is performed to fill all eight data elements of the head cache 208b in one operation; that is when all eight of its slots of the head cache 208b can be filled in the example of FIG. 2E. In some other implementations, the transfer of data from the hardware queue 230 to the head cache 208b may be performed in multiple read operations; this approach may be implemented because each data element contained in the head cache 208b is tracked by its corresponding head index 224 (shown in FIG. 2D).

Figure 3:
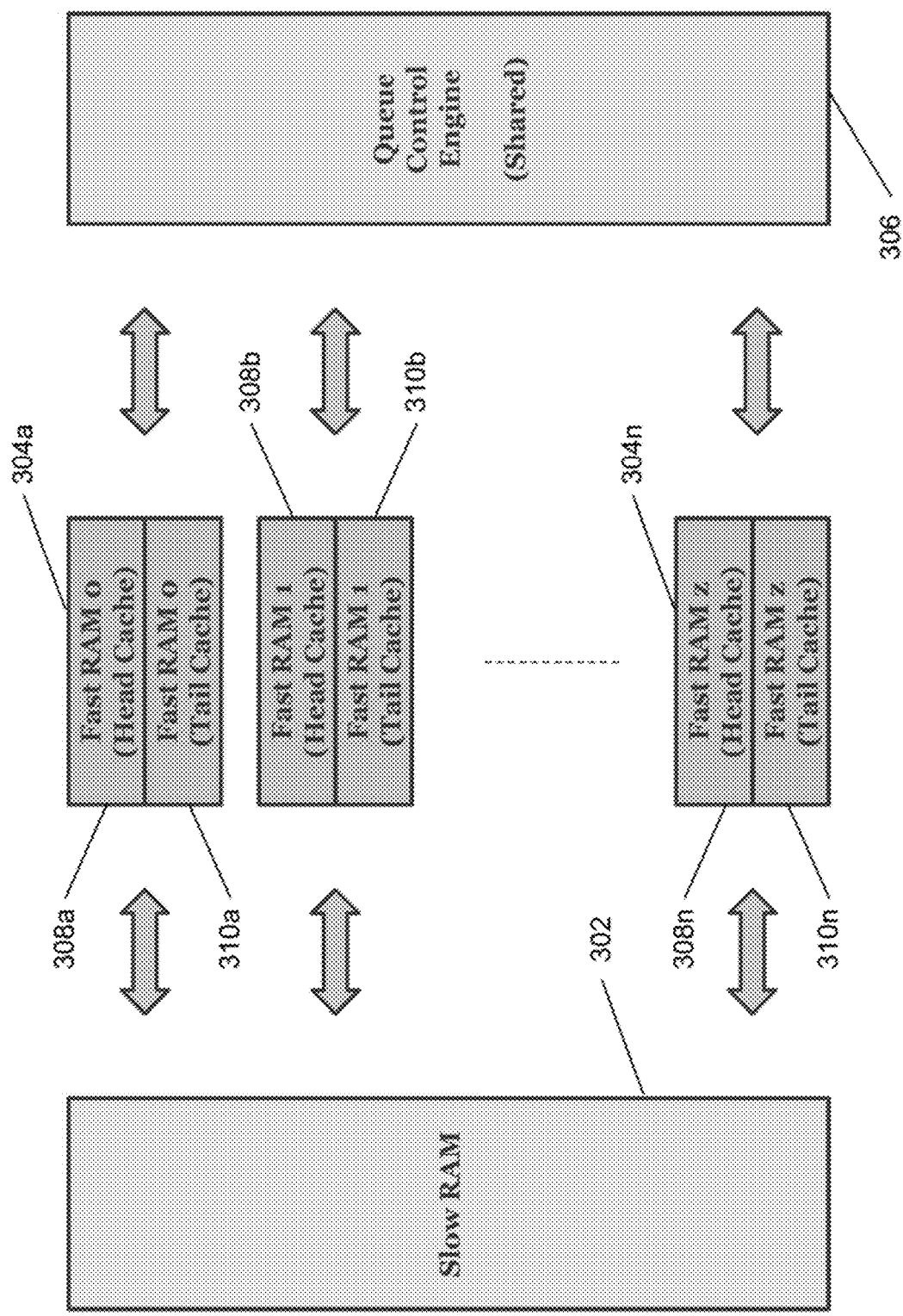
FIG. 3 illustrates another exemplary implementation of a system for controlling a plurality of hardware queues according to aspects of the present disclosure.

FIG. 3 illustrates another exemplary implementation of a system for controlling a plurality of hardware queues according to aspects of the present disclosure. Similar to the example shown in FIG. 2A, multiple hardware queues may be implemented with a combination of a slow random access memory (RAM) 302 and a set of fast RAMs such as 304a, 304b . . . and 304n. Each of the fast RAM in the set of fast RAMs may be controlled by a shared queue control engine 306. In addition, each of the fast RAM in the set of fast RAMs may include a head cache, labelled as 308a, 308b . . . 308n, respectively. Each of the fast RAM in the set of fast RAMs may include a tail cache, labelled as 310a, 310b . . . 310n, respectively. Similar to the systems described in FIG. 2A through FIG. 2E, this system for controlling the multiple hardware queues may be benefited by having a large number of hardware queues to be stored in the slow RAM 302, and at the same time enable efficient accesses to the large number of hardware queues through a set of fast RAMs (304a, 304b . . . 304n) and the shared queue control engine 306. According to aspects of the present disclosure, the size of the set of fast RAMs (304a, 304b . . . and 304n) are many orders of magnitudes smaller than the size of the fast RAM 116 (FIG. 1B) as in the conventional hardware queue implementations. Because of such reduction in the use of fast RAMs as compared to the conventional implementation shown in FIG. 1B, the disclosed implementation may achieve a substantial reduction in cost and at the same time maintaining substantially the high performance as if the multiple hardware queues were implemented with fast RAMs, such as SRAMs.

With the shared queue control engine 306, the disclosed implementation further simplifies the hardware queue control mechanism and reduces the cost in implementing individual queue control engines for each channel of the multiple hardware queues. In this implementation, each hardware queue is assigned a queue identifier (ID). The shared queue control engine may arbitrate the access to the multiple hardware queues based on the assigned queue ID for each of the hardware queues. One of the fast RAMs in the set of fast RAMs (304a, 304b . . . and 304n) may be active at one time. For multiple accesses to the slow RAM 302, the accesses are processed sequentially. This implementation may be particularly beneficial when the applications being serviced exhibit: 1) low access rate, 2) short access period, 3) sequential accesses, or some combinations thereof.

Note that the wait time in hardware is orders of magnitude shorter than a similar wait time if the same multiple accesses were processed in firmware or software. In other words, performance degradation with the sequential access is minimal in order to gain the disclosed simplification in the control mechanism of the hardware queues. Another benefit of the shared queue control engine implementation in situations where some of the hardware queue accesses may be delayed.

Figure 4:
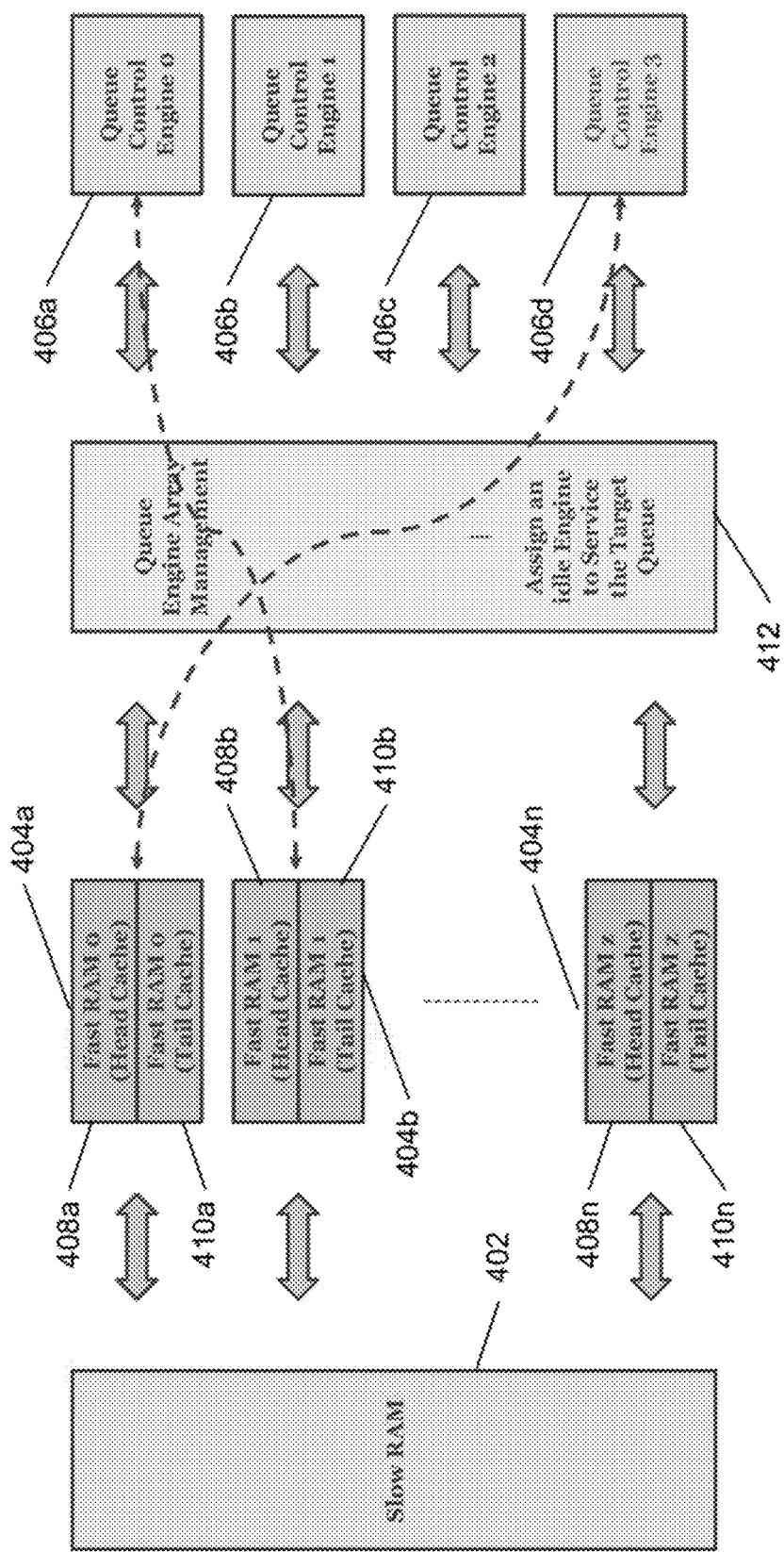
FIG. 4 illustrates an exemplary implementation of a shared queue control engine of FIG. 3 according to aspects of the present disclosure.

FIG. 4 illustrates another exemplary implementation of a system for controlling a plurality of hardware queues according to aspects of the present disclosure. As shown in FIG. 4, multiple hardware queues may be implemented with a combination of a slow random access memory (RAM) 402 and a set of fast RAMs such as 404a . . . and 404n. Each of the fast RAM in the set of fast RAMs may be controlled by a queue control engine in a plurality of queue control engines, for example 406a, 406b, 406c and 406d are shown in the example of FIG. 4. In addition, each of the fast RAM in the set of fast RAMs may include a head cache, labelled as 408a, 408b . . . 408n, respectively. Each of the fast RAM in the set of fast RAMs may include a tail cache, labelled as 410a, 410b . . . 410n, respectively. In addition, a queue engine array management unit 412 is configured to assign an idle queue engine to service a target queue. With this implementation, instead of each queue control engine being dedicated to a specific fast RAM (head cache and tail cache pair), the queue engine array management unit 412 improves the usage rate of the plurality of queue control engines by directing a queue control engine to work with any of fast RAM in the set of fast RAMs. For example, the queue control engine 0 (406a) may be configured to control the hardware queue accesses through the fast RAM 404b; and the queue control engine 3 (406d) may be configured to control the hardware queue accesses through the fast RAM 404a. With this implementation, by adding the queue engine array management unit 412, the efficiency/performance of the hardware queues may be further improved.

In the example shown in FIG. 4, four queue control engines (406a, 406b, 406c, and 406d) are shown. In other implementations, a different number of queue control engines can be employed based on the particular application. According to aspects of the present disclosure, the number of queue control engine may be increased or decreased with a software/firmware update.

Similar to the system described in FIG. 2A, this system for controlling the multiple hardware queues may be benefited by having a large number of hardware queues to be stored in the slow RAM 402, and at the same time enable efficient accesses to the large number of hardware queues through a set of fast RAMs (404a, 404b . . . and 404n) and the set of queue control engines (406a, 406b, 406c, and 406d). According to aspects of the present disclosure, the size of the set of fast RAMs (404a, 404b . . . and 404n) are many orders of magnitudes smaller than the size of the fast RAM 116 (FIG. 1B) as in the conventional hardware queue implementations. Because of such reduction in the use of fast RAMs as compared to the conventional implementation shown in FIG. 1B, the disclosed implementation may achieve a substantial reduction in cost and at the same time maintaining substantially the high performance as if the multiple hardware queues were implemented with fast RAMs, such as SRAMs.

Figure 5:
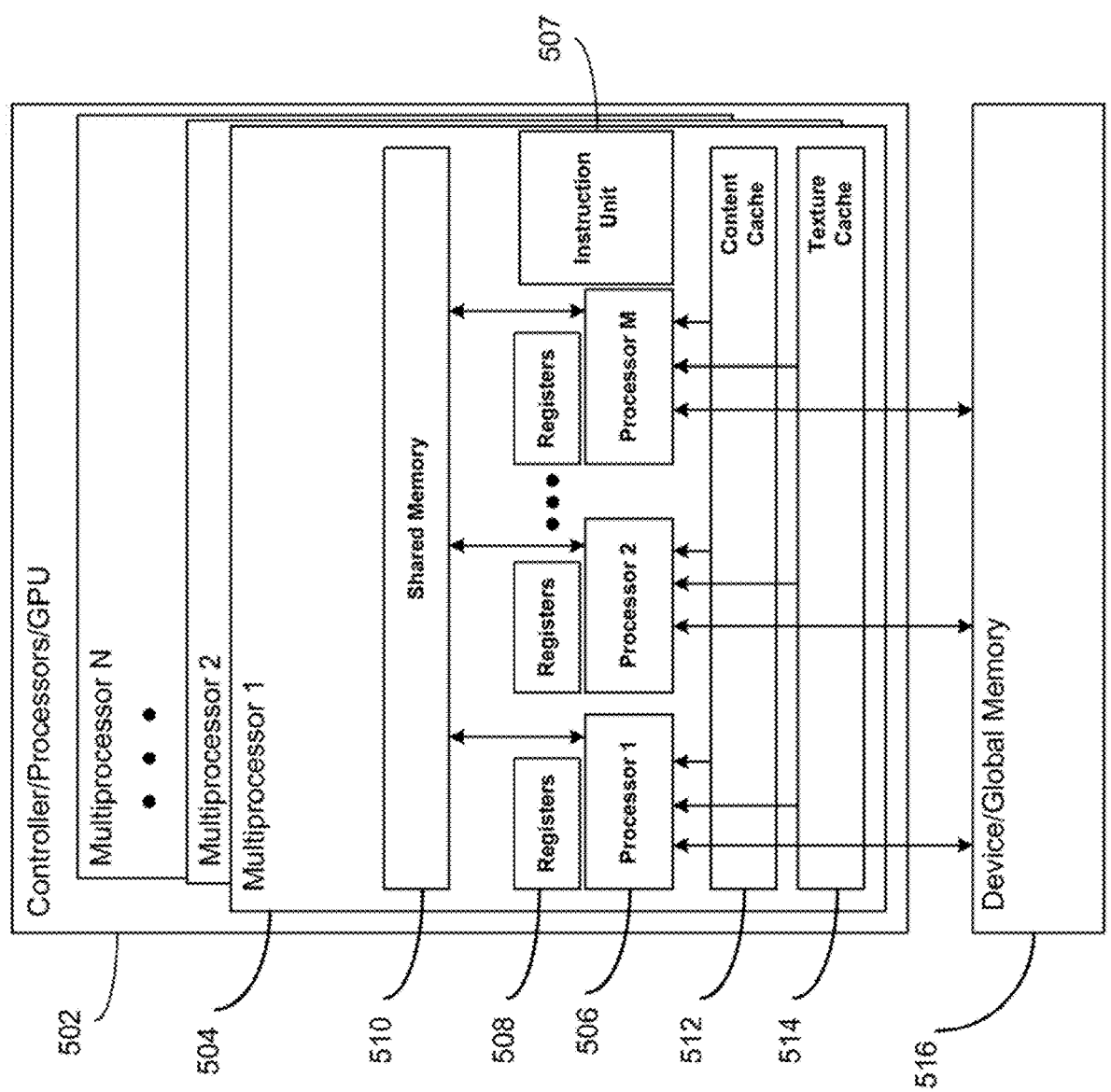
FIG. 5 illustrates an exemplary controller according to aspects of the present disclosure.

According to aspects of the present disclosure, one or more central processing units (CPUs) or graphic processing units (GPUs) may be configured to control the slow RAM, the set of fast RAMs, and the set of the queue control engines. FIG. 5 illustrates an exemplary controller according to aspects of the present disclosure. As shown in FIG. 5, each controller 502 includes N multiprocessors. Each multiprocessor 504 further includes M processors 506 and an instruction unit 507. Each processor has its own registers 508. All the processors 506 in one multiprocessor 504 share a block of shared memory 510. All the processors share the same set of constant cache 512 and texture cache 514 memories. They can also access the data in device memory 516, which is also referred to as the global memory.

In this example, each multiprocessor 504 has a block of shared memory. Accessing data from the shared memory 510 is much faster than accessing data from the device (global) memory 516. For this reason, one approach to increase computational efficiency is to load the data from the global memory 516 to the shared memory 510, perform much of the computations/manipulations using the shared memory 510, and then write back the results from the shared memory 510 to the global memory 516.

Controller 502 may include a plurality of multiprocessors, such as multiprocessor 1 through multiprocessor N. In this example, each of processor may be configured to execute tasks. The tasks may be of different types, and, in some examples, each respective type of task may be stored in or associated with a respective task queue while waiting for execution by a processor. The different types of tasks may include, for example, front end tasks, which may include receiving and interpreting instructions received from host device 4. Other types of tasks including caching; back-end tasks, which may include reading data from or writing data to NVM 10; housing-keeping, which may include garbage collection, wear leveling, TRIM, or the like; and system tasks. In some examples, each processor may be referred to as a compute unit, a processing unit, a core, or a central processing unit (CPU).

In accordance with examples of this disclosure, a first processor 506 may be configured to operate as a scheduler that schedules tasks for execution by at least one other processor. First processor 506 may assign tasks from a plurality of task queues to at least one other processor. As described above, each of the task queues may be associated with a task type.

In contrast to some other scheduling techniques, each task queue is associated with a respective priority ratio, and the priority ratio defines the frequency with which tasks from the respective task queue are scheduled by first processor 506 to be executed by the at least one processor. The respective priority ratio for each task queue may be based at least in part on the number of tasks in the respective task queue. In this way, the respective priority ratios are reflective of a number of tasks in the respective task queues, and the frequency with which tasks from a task queue are assigned by first processor 506 for execution is based at least in part on the number of tasks in the task queue.

In some examples, the respective priority ratios may be updated from time to time, such that the respective priority ratios are reflective of a current or recent number of tasks in the respective task queues. In this way, the techniques described herein may facilitate auto prioritization of the respective task queues based at least in part on the number of tasks currently or recently in the task queue.

For example, first processor 506 may determine the respective priority ratio associated with each task queue based at least in part on a number of tasks in the respective task queue. In some examples, first processor 506 additionally may base the priority ratio on a type of task associated with the respective task queue. For example, front-end tasks may have a higher priority than house-keeping tasks or system tasks. The priority ratio may define a relative frequency with which first processor 506 assigns task from the respective task queues to the at least one other processor. First processor 506 may update the respective priority ratio from time to time to adjust for the number of tasks in the respective task queue.

In some examples, first processor 506 may assign tasks from the respective task queues to the at least one other processor by progressing through tasks associated with the respective task queues in a predetermined order in which the task queues are interleaved. First processor 506 may determine whether to send a task from a respective task queue to be executed by at least one other processor based on the priority ratio of the respective task queue, which may be a ratio of execute indicators to skip indicators. In this way, when the priority ratio associated with a respective task queue is higher, first processor 506 assigns tasks from the respective task queue to the at least one other processor more often than when the priority ratio associated with the respective task queue is lower. Further, assuming the priority ratio is greater than zero, first processor 506 continues to assign tasks from each respective task queue to the at least one other processor.

Figure 6:
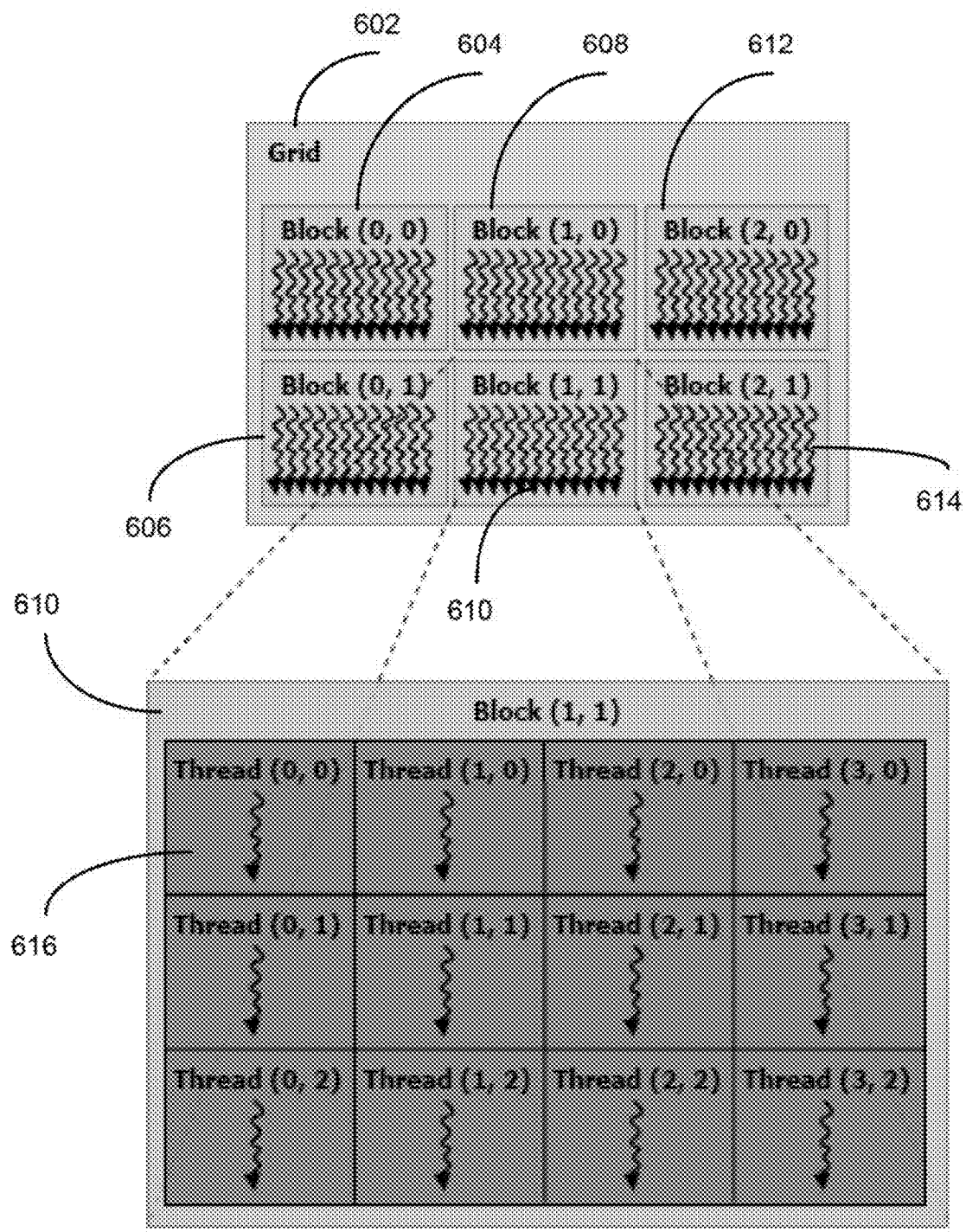
FIG. 6 illustrates an exemplary arrangement of threads in a controller according to aspects of the present disclosure.

FIG. 6 illustrates an exemplary arrangement of threads in a controller according to aspects of the present disclosure. In this example, threads are arranged in a grid 602, and they are divided into blocks of threads, for example block (0,0) 604, block (0,1) 606, block (1,0) 608, block (1,1) 610, block (2,0) 612, and block (2,2) 614. Each block of threads (for example block (1,1) 610, is assigned to one multiprocessor and threads within one block, for example thread (0,0) 616, can communicate with each other using the shared memory as described in association with FIG. 5.

Figure 7:
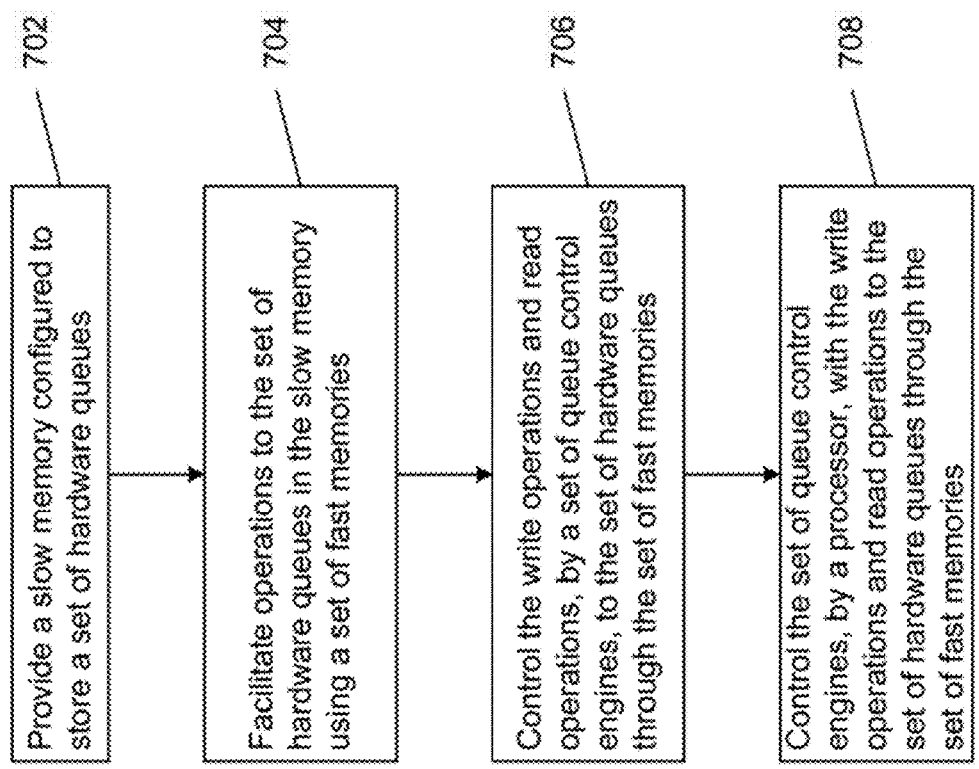
FIG. 7 illustrates an exemplary method of controlling hardware queues according to aspects of the present disclosure.

FIG. 7 illustrates an exemplary method of controlling hardware queues according to aspects of the present disclosure. In the example shown in FIG. 7, in block 702, the method provides a slow memory configured to store a set of hardware queues. In block 704, the method facilitates operations to the set of hardware queues in the slow memory using a set of fast memories. In some implementations, a fast memory in the set of fast memories includes a head cache configured to track read operations of a hardware queue in the set of hardware queues, and a tail cache configured to track write operations of the hardware queue in the set of hardware queues. In block 706, the method controls the write operations and read operations, by a set of queue control engines, to the set of hardware queues through the set of fast memories. In block 708, the method controls the set of queue control engines, by a processor, with the write operations and read operations to the set of hardware queues through the set of fast memories.

According to aspects of the present disclosure, the hardware queue may include a head pointer configured to identify a next read location in the hardware queue, and a tail pointer configured to identify a next write location in the hardware queue; and the hardware queue is implemented as a wrapped-around first-in first-out array with DRAMs.

In some implementations, the tail cache may include a first array for storing a set of data elements to be written to the hardware queue using a first array, and a second array for storing a set of write indices corresponding to the set of data elements to be written to the hardware queue. The first array and the second array may be implemented as a wrapped-around first-in first-out arrays with SRAMs; and the set of write indices are configured to track the set of data elements to be written to the hardware queue.

In some implementations, the head cache may include a third array for storing a set of data elements to be read from the hardware queue, and a fourth array for storing a set of read indices corresponding to the set of data elements to be read from the hardware queue. The third array and the fourth array are implemented as a wrapped-around first-in first-out arrays with SRAMs; and the set of read indices are configured to track the set of data elements to be read from the hardware queue.

In some implementations, the plurality of queue control engines may be consolidated into a shared queue control engine, and the operations to the set of hardware queues in the slow memory may be handled in a sequential manner by the shared queue control engine through the set of fast memories.

According to aspects of the present disclosure, the method may further include a queue engine array management unit configured to match an idle queue control engine in the set of queue control engines with a fast memory in the set of fast memories for accessing a hardware queue in the set of hardware queues.

According to aspects of the present disclosure, the hardware queue may be associated with a status table, and the status table may include a number of entries, an entry size, a maximum queue depth, a head location, a tail location, and an initialization data. The queue control engine may be configured to initialize the hardware queue with the initialization data without firmware or software interruption.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processors or controllers. Hence, references to specific functional units are to be seen as references to suitable means for providing the described functionality rather than indicative of a strict logical or physical structure or organization.

The invention can be implemented in any suitable form, including hardware, software, and firmware, or any combination of these. The invention may optionally be implemented partly as computer software running on one or more data processors and/or digital signal processors. The elements and components of an embodiment of the invention may be physically, functionally, and logically implemented in any suitable way. Indeed, the functionality may be implemented in a single unit, in a plurality of units, or as part of other functional units. As such, the invention may be implemented in a single unit or may be physically and functionally distributed between different units and processors.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as suited to the particular use contemplated.

What is claimed is:

1. A system for controlling hardware queues, comprising:
   a slow memory configured to store a set of hardware queues;
   a set of fast memories configured to facilitate operations to the set of hardware queues in the slow memory, wherein a fast memory in the set of fast memories includes a head cache configured to track read operations of a hardware queue in the set of hardware queues, and a tail cache configured to track write operations of the hardware queue in the set of hardware queues;

a set of queue control engines configured to control the write operations and read operations to the set of hardware queues through the set of fast memories, wherein the size of the head cache and the tail cache is adjusted based on the frequency of access to the slow memory, the priority of a queue control engine, in the set of queue control engines, that processes a read operation or a write operation of a given priority for accessing the slow memory, and the bandwidth of the slow memory being allocated to the queue control engine;

a processor configured to control the set of queue control engines with the write operations and read operations to the set of hardware queues through the set of fast memories; and a queue engine array management unit configured to match an idle queue control engine in the set of queue control engines to work with an assigned fast memory in the set of fast memories, replacing having each queue control engine being dedicated to a specific fast memory, for accessing a hardware queue in the set of hardware queues.

2. The system of claim 1, wherein the hardware queue includes a head pointer configured to identify a next read location in the hardware queue, and a tail pointer configured to identify a next write location in the hardware queue; and wherein the hardware queue is implemented as a wrapped-around first-in first-out array with DRAMs.

3. The system of claim 2, wherein the tail cache comprises:

a first array for storing a set of data elements to be written to the hardware queue; and a second array for storing a set of write indices corresponding to the set of data elements to be written to the hardware queue.

4. The system of claim 3, wherein the first array and the second array are implemented as a wrapped-around first-in first-out arrays with SRAMs, and wherein the set of write indices are configured to track the set of data elements to be written to the hardware queue, wherein writing the set of data elements to the hardware queue is controlled based on availability of the hardware queue and a priority of the write operation.

5. The system of claim 2, wherein the head cache comprises:

a third array for storing a set of data elements to be read from the hardware queue; and a fourth array for storing a set of read indices corresponding to the set of data elements to be read from the hardware queue.

6. The system of claim 5, wherein the third array and the fourth array are implemented as a wrapped-around first-in first-out arrays with SRAMs, and wherein the set of read indices are configured to track the set of data elements to be read from the hardware queue, wherein reading the set of data elements from the hardware queue is controlled based on availability of the hardware queue and a priority of the read operation.

7. The system of claim 1, wherein the plurality of queue control engines is consolidated into a shared queue control engine, and wherein the operations to the set of hardware queues in the slow memory are handled in a sequential manner by the shared queue control engine through the set of fast memories.

8. The system of claim 2, wherein the hardware queue is associated with a status table, and wherein the status table comprises a number of entries, an entry size, a maximum queue depth, a head location, a tail location, and an initialization data.

9. The system of claim 8, wherein the queue control engine is configured to initialize the hardware queue with the initialization data without firmware or software interruption.

10. A method for controlling hardware queues, comprising:

providing a slow memory configured to store a set of hardware queues;

facilitating operations to the set of hardware queues in the slow memory using a set of fast memories, wherein a fast memory in the set of fast memories includes a head cache configured to track read operations of a hardware queue in the set of hardware queues, and a tail cache configured to track write operations of the hardware queue in the set of hardware queues;

controlling the write operations and read operations, by a set of queue control engines, to the set of hardware queues through the set of fast memories, wherein the size of the head cache and the tail cache is adjusted based on the frequency of access to the slow memory, the priority of a queue control engine, in the set of queue control engines, that processes a read operation or a write operation of a given priority for accessing the slow memory, and the bandwidth of the slow memory being allocated to the queue control engine;

controlling the set of queue control engines, by a processor, with the write operations and read operations to the set of hardware queues through the set of fast memories; and matching, a queue engine array management unit, an idle queue control engine in the set of queue control engines to work with an assigned fast memory in the set of fast memories replacing having each queue control engine being dedicated to a specific fast memory, for accessing a hardware queue in the set of hardware queues.

11. The method of claim 10, wherein the hardware queue includes a head pointer configured to identify a next read location in the hardware queue, and a tail pointer configured to identify a next write location in the hardware queue; and wherein the hardware queue is implemented as a wrapped-around first-in first-out array with DRAMs.

12. The method of claim 11, wherein the tail cache comprises:

a first array for storing a set of data elements to be written to the hardware queue using a first array; and a second array for storing a set of write indices corresponding to the set of data elements to be written to the hardware queue.

13. The method of claim 12, wherein the first array and the second array are implemented as a wrapped-around first-in first-out arrays with SRAMs, and wherein the set of write indices are configured to track the set of data elements to be written to the hardware queue, wherein writing the set of data elements to the hardware queue is controlled based on availability of the hardware queue and a priority of the write operation.

14. The method of claim 11, wherein the head cache comprises:

a third array for storing a set of data elements to be read from the hardware queue; and a fourth array for storing a set of read indices corresponding to the set of data elements to be read from the hardware queue.

15. The method of claim 14, wherein the third array and the fourth array are implemented as a wrapped-around first-in first-out arrays with SRAMs, and wherein the set of read indices are configured to track the set of data elements to be read from the hardware queue, wherein reading the set of data elements from the hardware queue is controlled based on availability of the hardware queue and a priority of the read operation.

16. The method of claim 10, wherein the plurality of queue control engines is consolidated into a shared queue control engine, and wherein the operations to the set of hardware queues in the slow memory are handled in a sequential manner by the shared queue control engine through the set of fast memories.

17. The method of claim 11, wherein the hardware queue is associated with a status table, and wherein the status table comprises a number of entries, an entry size, a maximum queue depth, a head location, a tail location, and an initialization data.

18. The method of claim 17, wherein the queue control engine is configured to initialize the hardware queue with the initialization data without firmware or software interruption.

* * * * *